United States Patent [19]

Galand

[11] Patent Number: 4,589,130
[45] Date of Patent: May 13, 1986

[54] MULTIRATE DIGITAL TRANSMISSION METHOD AND DEVICE FOR IMPLEMENTING SAID METHOD

[75] Inventor: Claude Galand, Cagnes, France

[73] Assignee: International Business Machines Corp., Armonk, N.Y.

[21] Appl. No.: 458,796

[22] Filed: Jan. 18, 1983

[30] Foreign Application Priority Data

Feb. 9, 1982 [EP] European Pat. Off. ............ 82430003

[51] Int. Cl.⁴ .............................................. G10L 1/00
[52] U.S. Cl. ........................................ 381/31; 370/81
[58] Field of Search ................................... 381/29–41; 370/81; 375/118

[56] References Cited

U.S. PATENT DOCUMENTS

| | | | |
|---|---|---|---|
| 4,005,274 | 1/1977 | Vagliani et al. | 381/32 |
| 4,142,071 | 2/1979 | Croiser et al. | 381/29 |
| 4,191,858 | 3/1980 | Araseki | 381/31 |
| 4,216,354 | 8/1980 | Esteban et al. | 381/31 |
| 4,301,333 | 11/1981 | Gillette | 381/32 |
| 4,455,649 | 6/1984 | Esteban et al. | 381/29 |
| 4,464,782 | 8/1984 | Beraud et al. | 381/31 |
| 4,464,783 | 8/1984 | Beraud et al. | 381/31 |
| 4,477,900 | 10/1984 | Gruenberg | 381/30 |

Primary Examiner—E. S. Matt Kemeny
Attorney, Agent, or Firm—John B. Frisone

[57] ABSTRACT

In a TASI system using dynamic subband allocation and BCPCM (Block Companded PCM), losses due to freeze-out or delay are avoided by use of a multi-rate macro-frame format, wherein switching to a lower rate (24, 16, or 8 Kbs) for one or more of the input channels is accommodated by simply dropping one or more sections of each signal frame, since the lower rate bits are distributed over the entire frame.

7 Claims, 8 Drawing Figures

MULTIRATE DIGITAL TRANSMISSION METHOD AND DEVICE FOR IMPLEMENTING SAID METHOD

DESCRIPTION

1. Technical Field of the Invention

The present invention relates to a multirate digital transmission method and its application for concentrating digital information originating from several sources on a unique transmission channel. It applies more particularly to the transmission of digital information of speech origin.

2. Background of the Invention

The conditions of digital transmission over a given channel may vary in time. It is therefore advantageous to use emitters with several transmission rates (number of bits per second), equipped with simple means for switching from one rate to another, depending on the actual transmission conditions. Also, the cost of the transmission lines has induced manufacturers to look for methods which allow the transmission of information originating from several sources over the same path. The digital techniques are particularly convenient for this type of operation. For this, the signals of the different sources are individually sampled. These samples are digitally coded before being alternately and sequentially transmitted over the unique transmission path by means of the socalled time division multiplexing (TDM) techniques. However, if the system is to operate correctly, it is mandatory that at the other end of the transmission path, that is, at the receiving end, each recovers the signal addressed to him. In other words, it is not only necessary to correctly redistribute the samples by demultiplexing at the receiving end, but the information contained in the flow of samples received by the recipient must be sufficient to enable correct synthesis of the signal. More precisely, when said sources supply speech signals to be transmitted to the different recipients, the latter must receive information which is not only intelligible but also of sufficient listening quality. These are two contradictory requirements. On the one hand, for a signal to be correctly reproduced, its digital representation must be as precise as possible, which means that a rather big quantity of digital information is required to define it. On the other hand, the greater the quantity of information supplied by the same source during a given time, the smaller the number of sources serviced by the same transmission path.

There are numerous solutions to this kind of problem. Their great number proves the practical interest of the industry in the study of the problem and in finding efficient solutions. Furthermore, an increased effort can at present be observed in the technical field considered, which seems to prove that the limit of improving the system considered has not yet been attained.

Two research lines can be defined: the first one covers the processing of the signal supplied by each of the sources, the second one relates to the management of the sources.

In the present case, the signal sources are essentially of speech origin. Thus, when processing the signal supplied by a given source, the voice characteristics are taken into account to define the coding/decoding modes which for a minimum quantity of digital information modify the quality of the speech signal as little as possible. Numerous speech signal processing modes have been defined in a great number of reviews and publications. Reference is made to the book of J. Flanagan entitled 'Speech Analysis and Perception' published in 1965 by Springer Verlag, in order to become familiar with certain speech coding methods. Another literature source is the publication 'IEEE International Conference on Acoustics, Speech and Signal Processing.' This source mentions so-called speech compression techniques which are used to correctly code the speech signal with a minimum of digital information.

As to the management of a group of sources for concentrating them on the same transmission path or channel, the multiplexing techniques have already been mentioned. These techniques mainly allocate the transmission channel sequentially and cyclically to each one of the sources. Their limits are obvious. The transmission capacity of the channel (number of bits per second) can in principle not be lower than the sum of the bits supplied during the same second by the different sources. However, the speech signal sources are characterized by their intermittent activities. This means that for a source which at first sight seems to be active because it is connected at a given time to a person engaged in a conversation, periods of silence and inactivity embedded in periods of effective activity may be detected. Techniques have been developed to use the presence of these inactivity periods in order to associate the same transmission path with a group of 'L' sources, where L would seem, at first sight, an excessive number. Reference is made, for example, to the socalled TASI (Time Assignment Speech Interpolation) techniques. In these techniques, a device detects the sources of the group, which can be considered, at a given moment, to be in effective activity (according to predetermined criteria) and allocates the transmission channel only to these sources. The number 'L' is defined by means of statistical rules with all the risks this implies for a practical application. Thus, during instants of intense activity, the multiplexing system of the TASI type can cause a delay in the transmission of certain sources or simply freeze these sources, that is, interrupt their speech. All these solutions are of course to be excluded in a real-time, conversational mode system.

Finally, it can be envisaged to combine the socalled compression techniques, which compress the speech signal supplied by each of the sources, with the techniques of multiplexing the group of L sources. But in this case, it might be that in addition to the drawbacks inherent in each of the techniques, especially those mentioned above, there are the disadvantages due to an excessive complexity which jeopardizes any industrial application.

Methods for coding the signal to be transmitted which allow multirate transmission have been proposed, for example in an article by David J. Goodman published in the review 'IEEE Transactions on Communications,' volume COM28, no 7, July 1980, page 1040 and following. This article entitled 'Embedded DPCM for Variable Bit Rate Transmission' indicates a method for transmission at reduced rate by simple bit dropping operations. But on the one hand, the number of possible transmission rates is relatively limited because these rates can only be multiples of the sampling frequency. On the other hand, it seems necessary to transmit an auxiliary information to indicate to the receiver the selected transmission rate. It seems difficult with such a system to simply concentrate on the same transmission path the signals of several sources, some of which would by dynamically favored because of their instant activity.

SUMMARY OF THE INVENTION

An object of the present invention is a simple and efficient method for multirate digital transmission of speech signals in which the receiver derives the transmission rate used from the received speech information.

Another object of the present invention is a method for concentrating speech originating signals supplied by a group of L sources on the same transmission path by using a simple combination of compression techniques and multiplexing techniques.

A further object of the invention is to develop concentration techniques preventing any delay or freezing of any source during a traffic congestion period.

More particularly, the present invention processes by compressing the signal of each source by using techniques for splitting the bandpass of the corresponding speech signal into a given number of subbbands, and distributing the coding bits dynamically over the subbands. The signal issued by a given source is thus coded at a rate corresponding to the maximum allowed transmission rate. The bits of each macro sample (this is the information regrouping the samples of the group of subbands considered at the same instant of sampling) are distributed according to a predetermined format. The bits of the coded samples are placed into different fields of this format taking into account their weight and their distribution over the subbands for coding at each of the rates corresponding to each of the possible transmission rates defined beforehand. Thus, at each sampling instant, a socalled multirate macro sample is obtained. When the transmission rate to be effective at a given instant is selected, the format of the multirate macro sample obtained is eventually truncated by dropping the bits of one or several fields before they are transmitted.

The above method is particularly useful for concentrating speech signals issued by several sources on the same transmission path by allocating the highest coding rates to the most active sources.

Further objects, characteristics and advantages of the present invention will be explained in more detail in the following, with reference to the enclosed drawings which represent a preferred embodiment thereof.

DETAILED DESCRIPTION OF THE PREFERRED EMBODIMENT

Figure 1:
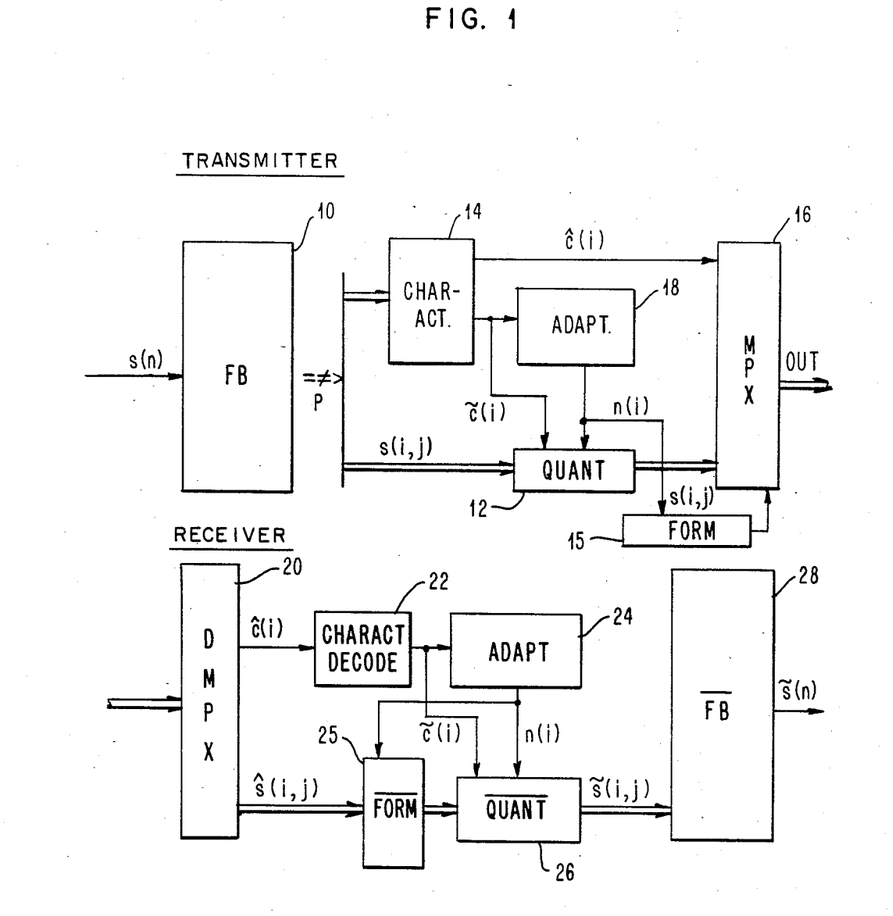
FIGS. 1 and 4 are basic circuit diagrams of coders used in the invention.

FIG. 1 illustrates a coder/decoder similar to the one (except for the circuit FORM described below) presented at the IEEE Conference in Camelot Inn, Tulsa, Okla., Apr. 10 12, 1978 by D. Esteban and C. Galand and entitled '32 Kbps CCITT Compatible Split Band Coding Scheme' published in the IEEE ICASSP 1978. A coder of the same type has also been described in the U.S. Pat. No. 4,142,071. The contents of the above mentioned references are to be incorporated by reference to this application. However, the elements required for implementing the invention will be recalled here. It is to be noted that between the devices mentioned in the documents above and the present description, there are some notation differences which, while obvious, will be indicated in order to avoid any ambiguity.

As will be realized later on, two basic principles are useful for the present invention. On the one hand, at least part of the band pass of the speech signals to be transmitted is divided into p (=8 or 16 for example) subbands to which the M (notation N being used in the mentioned article and patent) bits representing the coding resources are dynamically allocated. The reference element governing the dynamic distribution is the relative energy contained in the subband considered with respect to the other subbands. On the other hand, the dynamic character can have a relatively long time base (for example 8 to 32 ms). Thus, the initial speech signal is coded (or recoded) by successive segments using the so-called BCPCM techniques (Block Companded PCM) which can be summarized as follows: For each signal segment, a scale factor or characteristic term 'C' which is a function of the segment swing is defined and the speech signal is coded with respect to C. Since the speech signal is sampled at the Nyquist frequency, the characteristic term C is chosen in such a way that the biggest sample of the block is not beyond the coding limits during the considered time interval. The set formed by C and the quantized samples supplies the digital information which completely defines the signal segment having supplied the sample block considered. More details on the BCPCM techniques are given in the article by A. Croisier on a presentation given in the International Seminar of Digital Communications in 1974 in Zurich, entitled 'Progress in PCM and Delta Modulation: Block Companded Coding of Speech Signals.'

The above considerations helps understanding the operation of the devices illustrated in FIG. 1. The upper part represents an emitter including the coder which uses the above defined principles.

The speech signal covering a given frequency range and sampled at the Nyquist frequency supplies the samples S(n). These samples may have been coded beforehand at a relatively high bit rate (for example 12 bits per sample).

The signal represented by the samples S(n) is fed into a filter bank FB 10 from which originate 'p' subbands designated by B(i), where i = 1, 2, ..., p. At the output of the filter bank, and for each speech signal segment, there are thus N samples per subband (in the mentioned references, each signal segment contains K samples before subband filtering).

Let $S(i,j)$ denote the $j^{th}$ sample of the ith subband, that is $i = 1, 2, ..., p$ and $j = 1, 2, ..., N$. These samples are introduced in a quantizer 12 which separately processes each of the subbands. The quantizing step for each subband is defined for N samples as a function of the relative energy contained in said subband compared with the energies contained in the other subbands during the same time interval.

For each subband signal, a characteristic generator 14 determines the subband characteristic according to the relation:

$$C(i) = \text{Max}(|S(i,j)|) j = 1, ..., N \qquad (1)$$

This means that for each subband the samples S(i,j) of each block must be sorted to detect the one having the highest magnitude and to allocate its value to C(i). Thus, there are p characteristic terms C(1), C(2), ..., C(p) which are requantized in generator 14. Generator 14 converts the 12 bit code into a 4 bit code by means of a logarithmic scale table. The 4-bit coded characteristic terms are denoted C(i). These characteristic terms are sent into a multiplexer 16 which places the bits of the terms Ci and those of the samples S(i,j) (see below) into a given format. The C(i) terms are also decoded in generator 14 for use in (re)quantizer 12. The decoded characteristic terms are denoted C(i). These latter characteristic terms are used in (re)quantizer 12 for dynamic (or adaptive) allocation of the requantizing bits to the samples S(i,j). It can be shown that for a bit rate M expressed in bits per subband sampling period, the overall signal to quantizing noise is minimized if the number of bits n(i) allocated to requantizing the $i^{th}$ subband is governed by the relation:

$$n(i) = \frac{1}{p}\left[M - \sum_{j=1}^{p} \log \tilde{C}(j)\right] + \log \tilde{C}(i) \quad (2)$$

for $i = 1, 2, \ldots, p$ and $$\sum_{i=1}^{p} n(i) = M \quad (3)$$

where log is the base 2 logarithm.

In fact, relation (2) does not necessarily provide integer values. In practice, the values n(i) will be rounded to the nearest integer and limited to a predetermined number of values such as 0, 1, 2, 3, 4 or 5, for example. If the sum of values n(i) is different from M, it could be adjusted to M by using simple techniques such as described in the above-mentioned U.S. patent.

The operations for dynamically allocating the coding bits executing the functions of expressions (2) and (3) are executed in adapter device ADAPT referenced 18.

Requantizer 12 first determines the quantizing steps Q(i) to be used, so that $$Q(i) = C(i)/2^{n(i)-1} \quad (4)$$

for $i = 1, 2, \ldots, p$ and $n(i) \neq 0$.

Then the samples S(i,j) are requantized in requantizer 12 in such a way that the requantized samples S(i,j) are governed by the relation:

$$S(i,j) = \| S(i,j)/Q(i) \| \quad (5)$$

for $$\{i = 1, 2, \ldots, p \text{ and } n(i) \neq 0, j = 1, 2, \ldots, N. \quad (6)$$

the symbol $\| . \|$ denoting the truncation of the values obtained to the lowest integer.

The terms S(i,j) are also transmitted to multiplexer 16. However, the particularity of this multiplexer is that it is controlled by a formater FORM added to the coder of the prior art which formater will be described later.

At the receiver end illustrated in the lower part of FIG. 1, the terms C(i) and S(i,j) are used to reconstruct the original speech signal. For this, a multiplexer 20 separates the characteristics C(i) from the samples S(i,j). The 4 bit coded terms C(i) are decoded in 22 by inverse logarithm table-lookup. The decoded terms C(i) are used in an adapter device ADAPT 24 to determine the allocated bit rates n(i) for $i = 1, 2, \ldots, p$ by using the expressions (2) and (3). Values C(i), n(i) and S(i,j) are used to reconstruct the samples S(i,j) by inverse quantizing operations executed in 26. In fact, the inverse quantizer 26 first determines p quantizing steps Q(i) defined by relation (4), then reconstructs the subband samples so that for example:

$$S(i,j) = Q(i) \cdot (\ (i,j) + 0.5) \text{ if } n(i) \neq 0 \quad (7)$$

$$S(i,j) = 0 \text{ if } n(i) = 0 \quad (8)$$

for $i = 1, 2, \ldots, p$ and $j = 1, 2, \ldots, N$. \quad (9)

These subband samples (S(i,j)) are then recombined into a signal S(n) by means of a filter bank $\overline{FB}$ 28 which executes the reverse operations of filter bank FB 10.

It is to be noted that the prior art receiver has been provided with a device $\overline{FORM}$ referenced 25 which will be described later on.

Starting from the basic principle mentioned above, a method and a device will be described for preparing the multirate coding of a signal. After having coded and requantized the signal at the highest selected bit rate, the bits are arranged in the socalled multirate format. Adjustments for transmission at a given rate will then be achieved by simply truncating the set of bits obtained to the appropriate format. Furthermore, it can be noted that the decoder which is to reconstruct the speech signal will not require any special information indicating the bit rate selected from a predetermined set of rates.

The preferred embodiment has been made to code in p=8 subbands and on 16 ms signal segments with N=16 samples per subband by means of the coder illustrated in FIG. 1. The possible bit coding rates have been fixed at 32, 24, 16 and 8 Kbps (kilobits per second). Since the speech signal spectrum to be coded is limited to a frequency $\leq$ 4000 Hz, the Nyquist frequency is 8 KHz. In other words, the signal entering the coder of FIG. 1 is initially sampled at 8 KHz. The overall bit coding rate is to be kept constant between the input and output of the filter bank FB, thus a socalled decimation operation is performed in the filter bank FB. This operation reduces the sampling frequency to 1 KHz per subband (since p=8). At each sampling instant, eight samples must be (re) quantized over the group of eight subbands. This group of eight samples is called a macrosample. In other words, each 16 ms signal segment supplies 16 macrosamples in addition to the characteristic terms. By using the BCPCM techniques, eight characteristic terms are obtained per 16 ms signal segment. These terms, when coded in four bits, consequently use $(4\times 8)/16 \times 10^{-3} = 2$ Kbps. This means that only 30, 22, 14 or 6 Kbps are left to requantize the samples properly speaking. In other words, depending on whether the coding bit rate (or transmission rate V) is 32, 24, 16 or 8 Kbps, M=30, 22, 14 or 6 bits will be available for being dynamically allocated to the (re)quantization of each macrosample.

Reusing expression (2), this means that for:

$$V = 32 \text{ Kbps } n(i;32) = \frac{1}{8}\left[30 - \sum_{j=1}^{8} \log \tilde{C}(j)\right] + \log \tilde{C}(i) \quad (10)$$

$$V = 24 \text{ Kbps } n(i;24) = \tfrac{1}{8}\left[22 - \sum_{j=1}^{8} \log \widetilde{C}(j)\right] + \log \widetilde{C}(i) \quad (11)$$

$$V = 16 \text{ Kbps } n(i;16) = \tfrac{1}{8}\left[14 - \sum_{j=1}^{8} \log \widetilde{C}(j)\right] + \log \widetilde{C}(i) \quad (12)$$

$$V = 8 \text{ Kbps } n(i;8) = \tfrac{1}{8}\left[6 - \sum_{j=1}^{8} \log \widetilde{C}(j)\right] + \log \widetilde{C}(i) \quad (13)$$

where $i = 1, 2, \ldots, 8$.

The transmission rates, coding rates, number of subbands etc. have been carefully chosen to facilitate implementing the invention, as will be seen later on. It is to be noted that switching from one rate to the other in the chosen example results in varying $n(i)$ by 1, 2 or 3 bits, since:

$$\begin{aligned} n(i;32) &= n(i;24) + 1 \\ &= n(i;16) + 2 \\ &= n(i;8) + 3 \end{aligned} \quad (14)$$

The coder (see FIG. 1) is adjusted so as to code at 32 Kbps. This means that every 16 ms, 32 bits are reserved for coding the characteristic terms $C(i)$. 480 bits are thus left for quantizing the 16 macro-samples containing the values $S(i,j)$. If coding were to be at 8 Kbps, only 96 bits per 16 ms macro-sample block could be used. For each coding rate higher than 8 Kbps, that is (16, 24 and 32), there are 128 additional bits per macro-sample block.

A so-called macro-sample format is therefore chosen, including bit 'fields' of predetermined length. The bits obtained by coding each macro-sample are then carefully distributed over said fields. The bit arrangement thus obtained will form a so-called multirate macro-sample. For transmission at a selected rate, it will then be sufficient to select the required portion of the multirate macro-sample.

Figure 2:
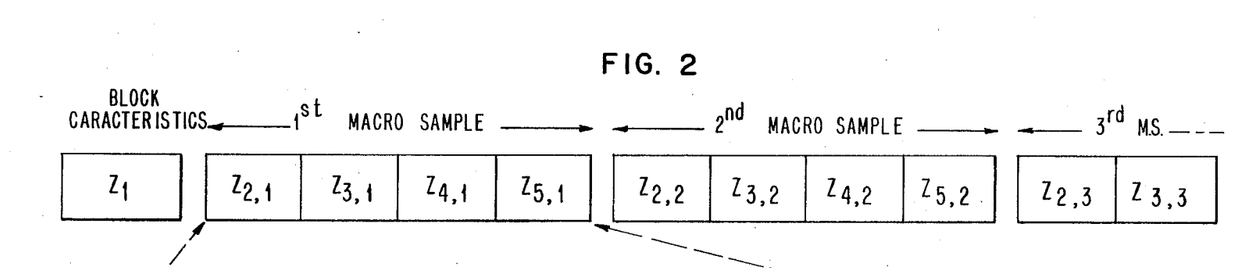
FIGS. 2, 3 and 3A illustrate formats for bit arrangements according to the invention.

For each 16 ms signal block, the bits obtained by coding the characteristic terms and the samples will be distributed according to the bit arrangement format of FIG. 2.

For each 16 ms speech signal segment, 32 bits obtained by coding the characteristic terms $C(i)$ for $i = 1, 2, \ldots, 8$, are placed in a field (1) referenced Z1. Then the bits of terms $S(i,j)$ of each coded macro-sample are distributed over four fields numbered 2 to 5 and referenced $Z_{u,j}$, where $j = 1, 2, \ldots, 16$, representing the rank of the macro-sample in the sample block considered, and $u = 2, 3, 4, 5$ representing the field reference number according to a format explained later on. It is to be noted that the bits of fields 2 to 5 form a multirate macro-sample. Each 16 ms signal block will supply 16 of these macro-samples. As can be seen later, the group of fields (1) to (5) will be maintained when transmitting or coding at 32 Kbps. However, when coding should be at 24 Kbps, each multirate macro sample will be truncated by simply dropping field (5). When coding at 24 Kbps, fields (4) and (5) will be dropped and at 16 Kbps field (3) through (5) will be dropped.

The number of fields of a multirate macro sample is of course related to the number of selected coding rates. In practice, there could be more rates than indicated above. The choice could be, for example, 12, 14, 16, 18, 20, 22, 24, 26, 28, 30 and 32 Kbps. This transmission rate system is therefore extremely flexible since it allows choosing rates which are not necessarily multiples of the speech signal sampling frequency.

The eight characteristic terms which are the same whatever the coding rate and hence the transmission rate chosen, are regrouped after 4-bit coding in field (1). These characteristic terms are then locally decoded in device 14 and used according to expression (10) to derive in device ADAPT 18 the bit rates $n(i;32)$ to be dynamically allocated to the (re) quantization of the macro-samples in device QUANT 12. The obtained $n(i;32)$ values are adjusted to the nearest integer. They can also be limited to a given range, for example $0 < n(i;32) \leq 5$. The resulting values are then adjusted so that their sum is equal to 30.

The terms $n(i;32)$ are also used in formater FORM 15 to determine the terms $n(i;24)$, $n(i;16)$ and $n(i;8)$ according to expression (14). As can be seen later, these terms must sometimes be adjusted. An example will now be given in order to better understand the rules for distributing the bits obtained by coding samples $S(i,j)$ in the multirate macro-sample fields. Assume that coding a speech signal segment at 32 Kbps by dynamic allocation provides the following bit rates:

TABLE I

| Subband i = | 1 | 2 | 3 | 4 | 5 | 6 | 7 | 8 | Total |
|---|---|---|---|---|---|---|---|---|---|
| n(i;32) | 5 | 4 | 5 | 5 | 3 | 2 | 3 | 3 | 30 |

The samples of the coded subbands for the $j^{th}$ sampling instant can thus be formulated as follows:

(knowing that in this case it is the $j^{th}$ sample, the term $j$ has not been included in the notation of bits X for reasons of simplification)

$S_{1,j} = X_1^5 X_1^4 X_1^3 X_1^2 X_1^1$ $S_{2,j} = X_2^4 X_2^3 X_2^2 X_2^1$ $S_{3,j} = X_3^5 X_3^4 X_3^3 X_3^2 X_3^1$ $S_{4,j} = X_4^5 X_4^4 X_4^3 X_4^2 X_4^1$ $S_{5,j} = X_5^3 X_5^2 X_5^1$ $S_{6,j} = X_6^2 X_6^1$ $S_{7,j} = X_7^3 X_7^2 X_7^1$ $S_{8,j} = X_8^3 X_8^2 X_8^1$ where $X_i^s$ indicates the bit of rank 's' of the $i^{th}$ subband, $X_i^1$ represents the least significant bit. The group:

$S_{1,j}, S_{2,j}, S_{3,j}, S_{4,j}, S_{5,j}, S_{6,j}, S_{7,j}, S_{8,j}$ forms the $j^{th}$ macro sample.

Relation (14) will yield:

| Subband i = | 1 | 2 | 3 | 4 | 5 | 6 | 7 | 8 | Total |
|---|---|---|---|---|---|---|---|---|---|
| n(i;24) | 4 | 3 | 4 | 4 | 2 | 1 | 2 | 2 | 22 |
| n(i;16) | 3 | 2 | 3 | 3 | 1 | 0 | 1 | 1 | 14 |

It can be seen that the number of bits allocated to the sixth subband is equal to zero for a rate of 16 Kbps. For operation at a lower rate (for example at 8 Kbps) certain rules must be established considering that $n(i)$ cannot be negative. One solution is to adjust values n(i) in several steps:

In the first step, one bit per subband is dropped where n(i) is different from zero.

If the total number of bits is still higher than the number of bits available for coding at 8 Kbps, the operations of the first step will be repeated in a second step starting with the subbands covering the ranges of the highest frequencies. This is justified because the contribution of the quantizing noise to the speech signal perception quality is less important for high frequencies than for low frequencies.

For the above example, the following table is obtained:

| Subband i = | 1 | 2 | 3 | 4 | 5 | 6 | 7 | 8 | Total |
|---|---|---|---|---|---|---|---|---|---|
| First Step n(i;8) | 2 | 1 | 2 | 2 | 0 | 0 | 0 | 0 | 7 |
| 2nd Step n(i;8) | 2 | 1 | 2 | 1 | 0 | 0 | 0 | 0 | 6 |

Once the quantizing bits have been dynamically allocated by formater FORM 15, the distribution over the bit fields obtained by macro-sample coding is relatively simple. If the bits of fields 2, 3, 4 and 5 of the same macro-sample are respectively denoted $\Delta i(2)$, $\Delta i(3)$, $\Delta i(4)$ and $\Delta i(5)$, we obtain:

$\Delta i(2) = n(i;8)$ $\Delta i(3) = n(i;16) - n(i;8)$ $\Delta i(4) = n(i;24) - n(i;16)$ $\Delta i(5) = n(i;32) - n(i;24)$ In this case, the distribution of the bits of each macro sample of a sample block coded at 32 Kbps according to Table I will be governed by Table II:

TABLE II

| Subband | $\Delta i$ | |
|---|---|---|
| FIELD (2) | | |
| 1 | 2 | |
| 2 | 1 | |
| 3 | 2 | |
| 4 | 1 | { $\Delta i(2)$ |
| 5 | 0 | |
| 6 | 0 | |
| 7 | 0 | |
| 8 | 0 | |
| FIELD (3) | | |
| 1 | 1 | |
| 2 | 1 | |
| 3 | 1 | |
| 4 | 2 | { $\Delta i(3)$ |
| 5 | 1 | |
| 6 | 0 | |
| 7 | 1 | |
| 8 | 1 | |
| FIELD (4) | | |
| 1 | 1 | |
| 2 | 1 | |
| 3 | 1 | |
| 4 | 1 | { $\Delta i(4)$ |
| 5 | 1 | |
| 6 | 1 | |
| 7 | 1 | |
| 8 | 1 | |
| FIELD (5) | | |
| 1 | 1 | |
| 2 | 1 | |
| 3 | 1 | |
| 4 | 1 | { $\Delta i(5)$ |
| 5 | 1 | |
| 6 | 1 | |
| 7 | 1 | |
| 8 | 1 | |

Each macro-sample is formated in multiplexer MPX 16 under control of circuit FORM 15. This circuit FORM 15 starts with value n(i;32) to derive the values n(i;24), n(i;16) and n(i;8) according to the above defined rules and to calculate values $\Delta i$. It then controls the formating of the bits of each macro-sample of the signal segment being processed. The most significant bits of the subband samples defined as a function of n(i;8) are placed in field (2). In the example considered, the two most significant bits of the sample of the first subband, that is $X_1^5 X_1^4$ are placed first, then the most significant bit of the second subband, that is, $X_2^4$ followed by $X_3^5$ $X_3^4$ and finally $X_4^5$. Formater FORM also defines the bits to be placed in field (3) by determining the bits to be added to pass from n(i;8) to n(i,16), that is, according to Table II as a function of the corresponding $\Delta i$. In field (3) will be placed $X_1^3$ followed of $X_2^3$, $X_3^3$, $X_4^4$, $X_4^3$, $X_5^3$, $X_7^3$ and $X_8^3$. In the field (4): $X_1^2$, $X_2^2$, $X_3^2$, $X_4^2$, $X_5^2$, $X_6^2$, $X_7^2$ and $X_8^2$.

Then in the field (5): $X_1^1$, $X_2^1$, $X_3^1$, $X_4^1$, $X_5^1$, $X_6^1$, $X_7^1$ and $X_8^1$. This corresponds to a bit distribution according to the following TABLE III:

TABLE III

| | Field 2 | | Field 3 | Field 4 | Field 5 |
|---|---|---|---|---|---|
| $S_{1,j} =$ | $X_1^5$ | $X_1^4$ | $X_1^3$ | $X_1^2$ | $X_1^1$ |
| $S_{2,j} =$ | $X_2^4$ | $X_2^3$ | $X_2^2$ | $X_2^1$ | |
| $S_{3,j} =$ | $X_3^5$ | $X_3^4$ | $X_3^3$ | $X_3^2$ | $X_3^1$ |
| $S_{4,j} =$ | $X_4^5$ | $X_4^4$ | $X_4^3$ | $X_4^2$ | $X_4^1$ |
| $S_{5,j} =$ | | $X_5^3$ | $X_5^2$ | $X_5^1$ | |
| $S_{6,j} =$ | | | $X_6^2$ | $X_6^1$ | |
| $S_{7,j} =$ | | $X_7^3$ | $X_7^2$ | $X_7^1$ | |
| $S_{8,j} =$ | | $X_8^3$ | $X_8^2$ | $X_8^1$ | |

Figure 3:
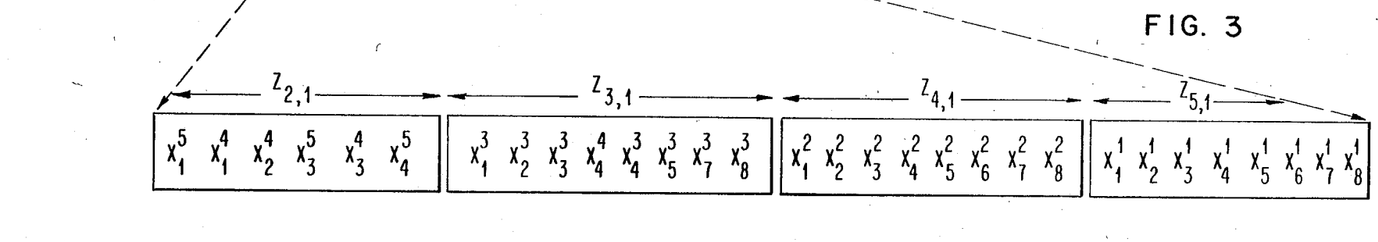

FIG. 3 illustrates the scheme of a multirate macro-sample according to Table III above. The bits are placed in predetermined 'fields' according to their order (or positions in sample S(i,j) to which they belong) and to their coding contribution at each of the possible coding rates.

Figure 3A:
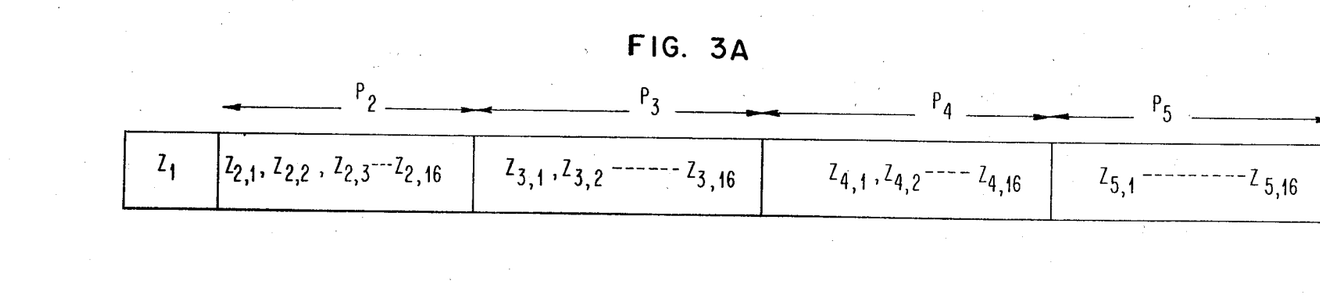

Formater FORM 15 also controls multiplexer MPX 16 to regroup similar fields of the macro-samples obtained from the same sample block corresponding to a signal duration of 16 ms according to FIG. 3A. In this scheme, $Z_{u,j}$ denotes the field of order u (u=2, 3, 4 or 5) of the $j^{th}$ (j=1, 2, ..., 16) macro-sample of the block considered.

The above described method is particularly advantageous for digital transmission at different predetermined rates, because of the subdivision into subbands in the TABLE II-continued

| Subband | $\Delta i$ | |
|---|---|---|
| 4 | 1 | { $\Delta i(5)$ |
| 5 | 1 | |
| 6 | 1 | |
| 7 | 1 | |
| 8 | 1 | | coder, which supplies the macro-samples whose bits can be arranged according to a judicious format.

For this, formater FORM 15 controls the final formating of the macro-samples through truncation by dropping one or several fields depending on the chosen transmission rate. After a possible truncation of the multirate macro-sample, each 16 ms speech signal segment supplies through the combined action of formater 15 and multiplexer 16 a bit block to be transmitted over the transmission path linked to the output of multiplexer 16. The first portion of this block contains the values C(i) and the second portion contains 16 truncated macrosamples (if the chosen coding bit rate is lower than maximum possible rate, that is 32 Kbps). The truncation of the macro-sample of the same block is in practice effected in multiplexer MPX 16 which truncates the macro sample block (see FIG. 3A) by one or several portions P2 to P5.

The reception rules can be easily derived from the rules described above to explain the buildup of the macro-samples to be transmitted. A circuit $\overline{FORM}$ 25 (see lower part of FIG. 1) has been added to the prior art receiver. Knowing the effective transmission rate chosen among a group of predetermined transmission rates, this circuit recovers the information n(i) governed, for example, by expressions (10) to (14). From there, circuit $\overline{FORM}$ 25 recovers information such as indicated in Table III. It can then continue to demultiplex the bits of the macro-samples to recover the samples of the subband to be submitted to the inverse quantizer $\overline{QUANT}$. In practice, it is not necessary to indicate the emitting rate to the receiver. This rate could be derived from the measurement of the length of the received macro samples. This length will be measured by detecting in the flow of bits received information called 'flag' which delimits the bit blocks formed by the values C(i) followed by 16 macro-samples.

By way of example, let us assume that the transmission rate is 16 Kbps. Fields (4) and (5) of each multirate macro-sample will thus have been truncated. Referring to the example yielding the multirate macro-sample format illustrated in FIG. 3, truncated macro samples will have been transmitted and hence received, their format being:

$X^5_{1,j} X^4_{1,j} X^4_{2,j} X^5_{3,j} X^4_{3,j} X^5_{4,j} X^3_{1,j} X^3_{2,j} X^3_{3,j} X^4_{4,j} X^3_{4,j} X^3_{5,j} X^3_{7,j} X^3_{8,j}$ for $j=1, 2, \ldots, 16$.

Circuit $\overline{FORM}$, 25 will use the recovered Table II to direct each of the received bits to the subband and the bit order it belongs to. This allows recovering the samples:

$S_{1,j} = X^5_1 X^4_1 X^3_1$ $S_{2,j} = X^4_2 X^3_2$ $S_{3,j} = X^5_3 X^4_3 X^3_3$ $S_{4,j} = X^5_4 X^4_4 X^3_4$ $S_{5,j} = X^3_5$ $S_{6,j} = 0$ $S_{7,j} = X^3_7$ $S_{8,j} = X^3_8$

The above terms are then extended to a 32 Kbps coding by adding zero bits taking into account the rules for dynamically allocating coding bits to the subbands for 32 Kbps. The term n(i;32) will have been determined by device ADAPT 24. Thus, the samples submitted to reverse quantization by $\overline{QUANT}$ 26 will, for the example mentioned, be the following:

$S_{1,j} = X^5_1 X^4_1 X^3_1 00$ $S_{2,j} = X^4_2 X^3_2 00$ $S_{3,j} = X^5_3 X^4_3 X^3_3 00$ $S_{4,j} = X^5_4 X^4_4 X^3_4 00$ $S_{5,j} = X^3_5 00$ $S_{6,j} = 00$ $S_{7,j} = X^3_7 00$ $S_{8,j} = X^3_8 00$

It is obvious that the method according to the invention can be applied to a subband coder other than that illustrated in FIG. 1.

There are other types of coder using, at least to a certain extent, subband coding. This is the case of the socalled predictive coder described in the IEEE Proceedings of the International Conference on Acoustics, Speech and Signal Processing, Tulsa, Okla., Apr. 12, 1978, pages 307 to 311. The part of this coder effecting requantization operations uses the techniques described in U.S. Pat. No. 4,216,354 (Ser. No. 964,324) assigned to the same assignee. Both the IEEE article and U.S. Pat. No. 4,216,354 are to be herein incorporated by reference.

According to the method described in U.S. Pat. No. 4,216,354 and implemented by means of the device illustrated in present FIG. 4, the speech signal spectrum is limited to the telephone range ($\leq 4000$ Hz) in filter FT. The signal supplied by filter FT is then sampled at 8 KHz and digitally coded with 12 bits by an A/D converter. The signal provided by the A/D converter is used to generate three types of information. The first information COEFF represents the socalled partial autocorrelation coefficients $k_i$ determined by CALC and quantized by QA2. The The second information ENERG relating to energy is obtained by filtering in EN and by quantizing in QA1. The third information SIGNAL is obtained by subband coding (in SBC) of the low frequency band, called speech signal base band obtained by filtering in LPFD the signal provided by the A/D converter. As much as the base band signal is limited to a frequency bandwidth ranging from 300 to a maximum of 1000 Hz, this signal differs only slightly from the socalled residual or excitation signal of the predictive coder described in Tulsa. The base band signal provided by filter LPFD is in fact requantized in SBC by dynamic allocation of the bit rate available among different subbands. This requantization uses the principles mentioned above with respect to the device illustrated in FIG. 1. Thus, the multirate transmission method of the present invention can be applied to the subband coding effected by device SBC. It would be sufficient to add to the device of FIG. 4 a circuit similar to circuit FORM operating on the SIGNAL part of the information. It would be only necessary to provide in field (1) of the bit arrangement format space for terms ENERG and COEFF in addition to that reserved for the characteristic terms resulting from coding the SIGNAL part.

As already mentioned, the subband coding method is particularly advantageous for concentrating the speech signals of several sources onto the same transmission path.

Figure 5:
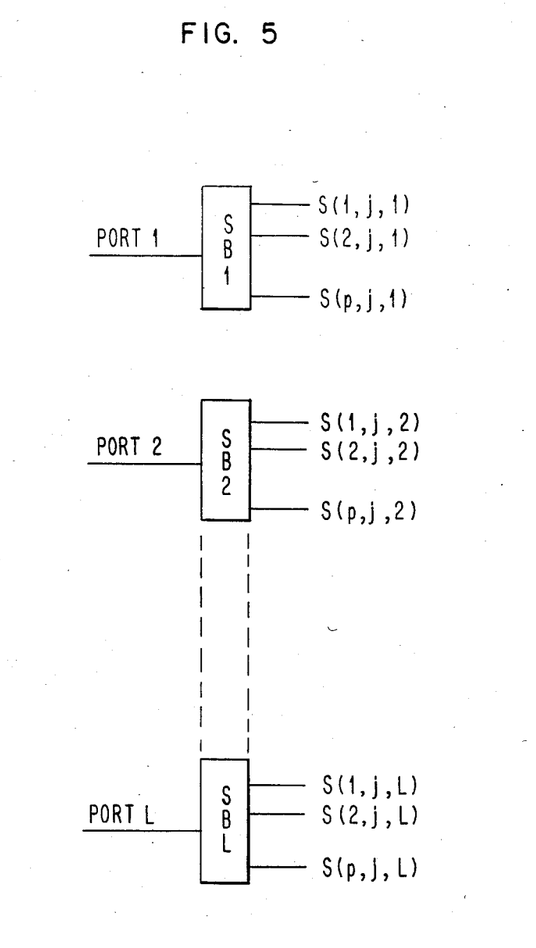
FIG. 5 is a block diagram of a concentrator according to the invention.

FIG. 5 shows L sources respectively connected to ports PORT1 to PORTL.

The filter banks belonging to the subband coders respectively processing the signals of ports 1 to L being referenced SB1, SB2, ..., SBL, the distribution of the subband samples is that shown in FIG. 5.

The quantizing bits of the signals of the different ports can be coded by optimum dynamic allocation so as to cover all p.L signals of the subbands. For this, the following operations could be executed:

Determining the characteristics $$C(i,k) = \text{Max}(|S(i,j,k)|)j=1,N$$

for
i=1, ..., p
k=1, ..., L.
Coding the characteristics
Controlling the port activity and dynamically allocating the (re)quantizing bits of the subband signals:

$$n(i,k) = \frac{1}{pL} \left[ M.L - \sum_{j=1}^{p} \sum_{k=1}^{L} \log \tilde{C}(j,k) \right] + \log \tilde{C}(i,k) \quad (15)$$

for
i=1, ..., p k=1, ..., L  (16)

with the additional constraint:

$$\sum_{k=1}^{L} \sum_{i=1}^{p} n(i,k) = M.L \quad (17)$$

adjusting values n(i,k) by truncating them to the nearest integer. These integers will be limited to a predetermined number of values such as for example 0, 1, 2, 3, 4, 5. The values n(i,k) will then be adjusted so that expressions (15) to (17) are verified, and
(Re)quantizing the samples of each subband.

The method just described has the advantage of supplying a coding means by dynamic allocation covering in an optimum manner all p.L subbands. However, it may have some drawbacks if it is to be applied to a TASI type system. Because the activity control of the ports is distributed over all subbands, it would be useful to cause an interaction between the ports and a central controller. Each port k would provide the controller with characteristics C(i,k), i=1, ..., p, where the bit allocations would be calculated by means of expressions (15) to (17) to be returned to the ports for quantization. These drawbacks may, to a certain extent, be avoided by using the following method.

This method which is based on the application of the above described multirate coding principles is particularly interesting. This method comprises three essential steps: A first step called coding step during which the signal of each port is coded at a predetermined bit rate chosen so as to be the highest bit rate among those to be used (for example 32 Kbps). The bits obtained by coding are furthermore separately distributed for each considered port according to the multirate macro-sample format described above. A second step, called port activity determination step, during which the relative activity of each port is determined. This relative activity is used to determine the coding bit rate to be applied to each source. A third step during which the multirate macro-sample of each source may be truncated depending on the coding bit rate allocated to it.

Figure 6:
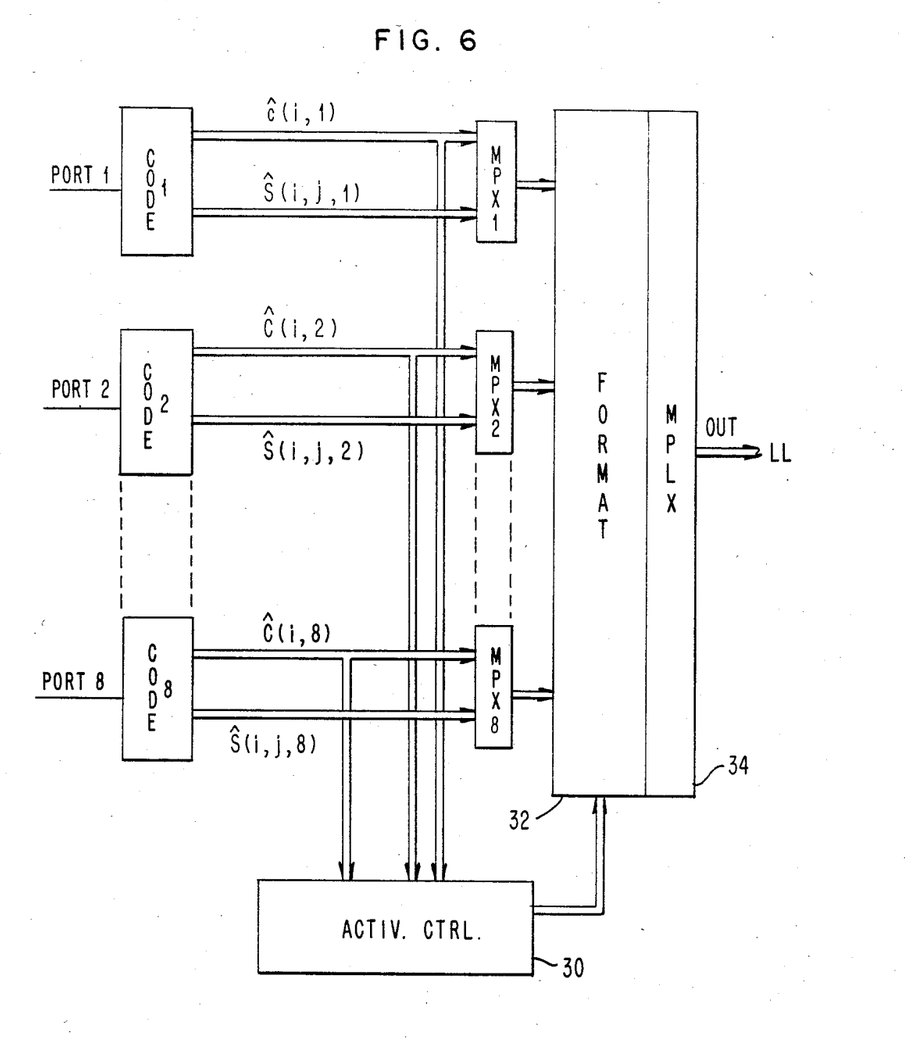
FIGS. 6 and 7 are detailed diagrams of concentrators according to the invention.

FIG. 6 shows the basic circuit design of a device for concentrating the signals of L sources on a unique path LL. By way of example, L=8 has been chosen. The signal of each source applied to a port (PORT1 to PORT8) is coded in p=8 subbands using a coder CODE(k), where k=1, 2, ..., 8 indicates the coder rank.

Each coder supplies the characteristic terms C(i,k) and the requantized samples S(i,j,k). Each speech signal is coded at the highest rate chosen, that is 32 Kbps, using the BCPCM techniques and dynamic allocation of the coding rate for each port taken separately. Then, the multirate macro-sample are built up and arranged by blocks according to the format of FIG. 3A. MPX(k) is the device for formating the multirate macro-sample associated with the kth port. Device MPX(k) can be considered as grouping devices (15) and (16) of FIG. 1 except that the macro-samples (or macro-sample blocks) coming from each device MPX(k) are not truncated. They are therefore at the maximum rate and may be truncated in a device FORMAT 32 after device 30 has measured the relative activity of each port with respect to the other ports and has derived the transmission rate to be allocated during 16 ms to the port considered.

The operations for determining the relative port activity and for defining the transmission rate allocated to each port are based on the application of expressions (15) to (17). But direct application of these expressions results in an adjustment problem. First, a port bit rate must be determined:

$$N(k) = \sum_{i=1}^{p} n(i,k) \quad (18)$$

This rate must be adjusted so as to be equal to one of the possible transmission rates (that is, 8, 16, 24 or 32 Kbps for the chosen example).

Then, one must have:

$$\sum_{k=1}^{L} N(k) = M.L = Nc \quad (19)$$

where Nc is equal to the portion of channel LL capacity available for transmitting the macro-samples of the ports.

However, the application of expressions (18) and (19) requires readjustment, and any action on one expression affects the other one, thus complicating the method. To avoid this disadvantage, it has been decided to split the problem into two parts.

Indeed, the following can be derived from expression (15):

$$\sum_{i=1}^{p} n(i,k) = \sum_{i=1}^{p} \left[ \frac{1}{pL} \left[ ML - \sum_{j=1}^{p} \sum_{l=1}^{L} \log \tilde{C}(j,l) \right] + \log \tilde{C}(i,k) \right] \quad (20)$$

where $$N(k) = \frac{1}{L}\left[ ML - \sum_{l=1}^{L}\sum_{j=1}^{p} \log \tilde{C}(j,l) \right] + \sum_{i=1}^{p} \log \tilde{C}(i,k) \quad (21)$$

If, we put:

$$W(l) = \sum_{j=1}^{p} \log \tilde{C}(j,l) \quad (22)$$

where W(k) is the activity of the gate PORTk.

We obtain then:

$$N(k) = \frac{1}{L}\left[ ML - \sum_{l=1}^{L} W(l) \right] + W(k) \quad (23)$$

where l is a computing index which is varied from l=1 to l=L to scan all ports PORT1 to PORTL.

Expression (23) gives an optimum dynamic distribution of the ML bits used for coding the signals among the L ports depending on their activities W(k). This expression is similar to expression (2).

It must be noted that instead of determining activity W(k) of the port of rank k, the information elements nearly proportional to the energy of each subband, that is terms C(i,k), could be sorted when the used coders are those shown in FIG. 1. (As will be seen later, the operation of measuring the port activity can be a little more complex for a system using the coder illustrated in FIG. 4).

$$W'(k) = \log \text{Max}[C(i,k)] i=1,2,\ldots,p \quad (22')$$

The formulae (23) will be then:

$$N(k) = \frac{1}{L}\left[ ML - \sum_{l=1}^{L} W'(l) \right] + W'(k) \quad (23')$$

The above formula (23') acts against low level locutors when confronted to higher level locutors. This can be remedied by normalizing the terms used as a reference to the measurement of the energy generated by the various locutors. A new term W"(k) is then, defined, which defines a weighted source activity as a function of the prior activity of this very source:

$$W''(k) = \frac{W'(k)}{<W'(k)>} \quad (22'')$$

where <W'(k)> is representative of the W'(k)'s over a relatively long period of the order of the syllabic time length (0.5 through 2 seconds, for instance). Besides, a threshold which shall not be exceeded, is assigned to term W'(k).

These new terms W"(k) would thus be used in (23') instead of W'(k).

The number of operations required for measuring the activity of ports PORT1 to PORTL and for deriving the transmission rate to allocate to each port is nearly the same whether expressions (22) and (23) or (22') and (23') are used.

The 4-bit coded terms C(i,k) are decoded by activity measuring device (30) before being submitted to sorting. It would of course be possible to use the terms C(i,k) already available.

Device 30 comparing the port activities determines their relative activity coefficients N(k) which are governed by expression (23').

Nc can be a fraction only of the transmission capacity of path LL if the latter is only partially used for the TASI transmission of speech originating signals.

Furthermore, for the above reasons, the N(k) terms for k=1, ..., L will be truncated to the nearest integer of the admitted bit rates (that is, in the present example 8, 16, 24 or 32 Kbps). The truncated port bit rates thus obtained are then adjusted (in the present case by increments of 8 Kbps) to maintain their sum constant and equal to Nc. The coding rates of the considered ports could be adjusted by simply adding or subtracting 8 Kbps according to a predetermined priority known by the receiver which at the other end of path LL must recover the speech signals. The constraint is therefore that N(k) can only be equal to 8, 16, 24 or 32 Kbps in case these rates have been chosen. In practice, these systems can be refined by increasing the number of possible rates without changing the principles of the invention.

FORMAT device 32 is controlled by activity controller 30. The macrosamples of each port can thus be given a format corresponding to the bit rate allocated to said port, by eventually truncating (if necessary) the multirate macro-sample supplied by circuits MPX(k). These operations will depend on the value of N(k) allocated to the considered port according to expression (23') depending on its activity with respect to the other ports, that is, its relative activity during the predetermined time considered (example 16 ms).

Depending on the value of N(k), activity controller 30 may control the truncation of the 16 macro-samples of the same block by simply dropping bit fields. This operation may be effected separately for each port. But the macro-samples truncating operations can be simplified when circuits MPX(1) to MPX(8) format each block of multirate macro-samples according to the format in FIG. 3A. Multiplexer MPLX 34 transmits every 16 ms the eight characteristics and blocks of macro-samples of the ports over path LL using conventional time multiplexing techniques.

A group of L bits may be reserved for identifying the ports which are not active.

It is in general not necessary to transmit the coding rate of the ports because at the receiving end they can be derived from the characteristic terms C(i,j) for each port by using expressions (22') and (23').

If channel LL is noisy, parity or control bits must be added to the macro-samples. For this, a socalled control channel (or port) of low capacity can be provided.

In the conventional TASI systems, certain ports can be completely 'frozen' because of the traffic density of the other ports. This means that the speech of certain system users is interrupted, which is rather undesirable. The system according to the invention avoids these drawbacks by fixing the number L of the serviced ports such that:

$$Nc = (8.L) \text{ Kbps} \quad (24)$$

Taking into account that dense traffic conditions are practically present during 5% of the time only, the intermittent quality degradation due to an 8 Kbps operation may be more acceptable than port 'freeze-out'. Furthermore, certain ports may have higher priority than others.

If priority is to be given to the port of rank $k_o$, a lower limit could be set for $N(k_o)$, for example $N(k_o)=24$ Kbps. In these circumstances, the dynamic allocation of the coding bits to (L-1) ports other than the port ranked $k_o$ will be made at (Nc-24) instead of Nc for $k=1, 2, \ldots, L$ with $k \neq k_o$.

Figure 4:
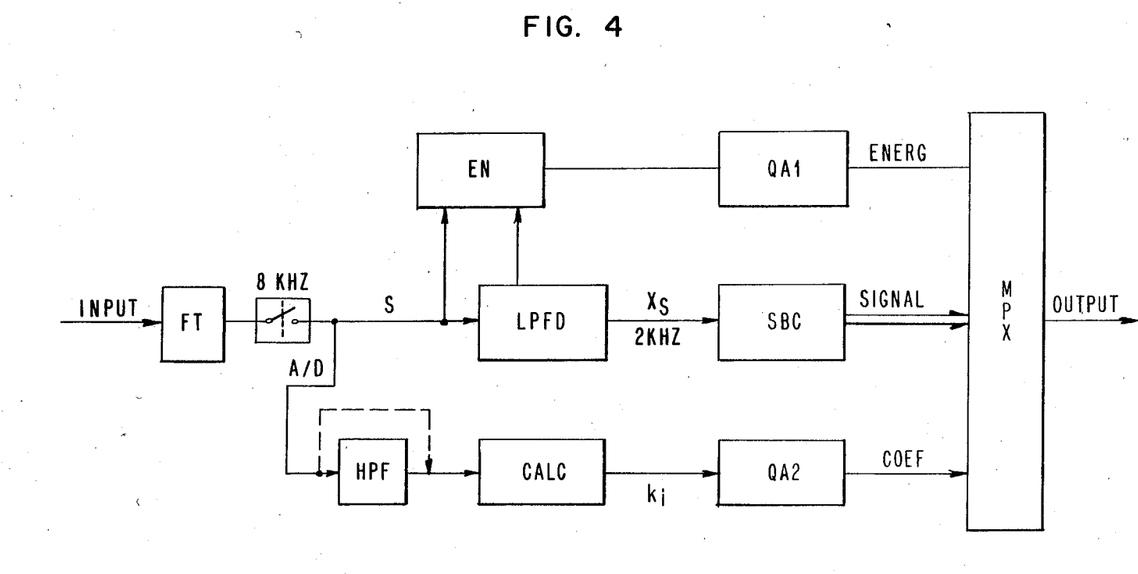

While the above method has been described such as it would be applied to a system using the type of coder represented in FIG. 1, it must be noted that the same method applies to other subband coders, especially to the coder illustrated in FIG. 4.

Figure 7:
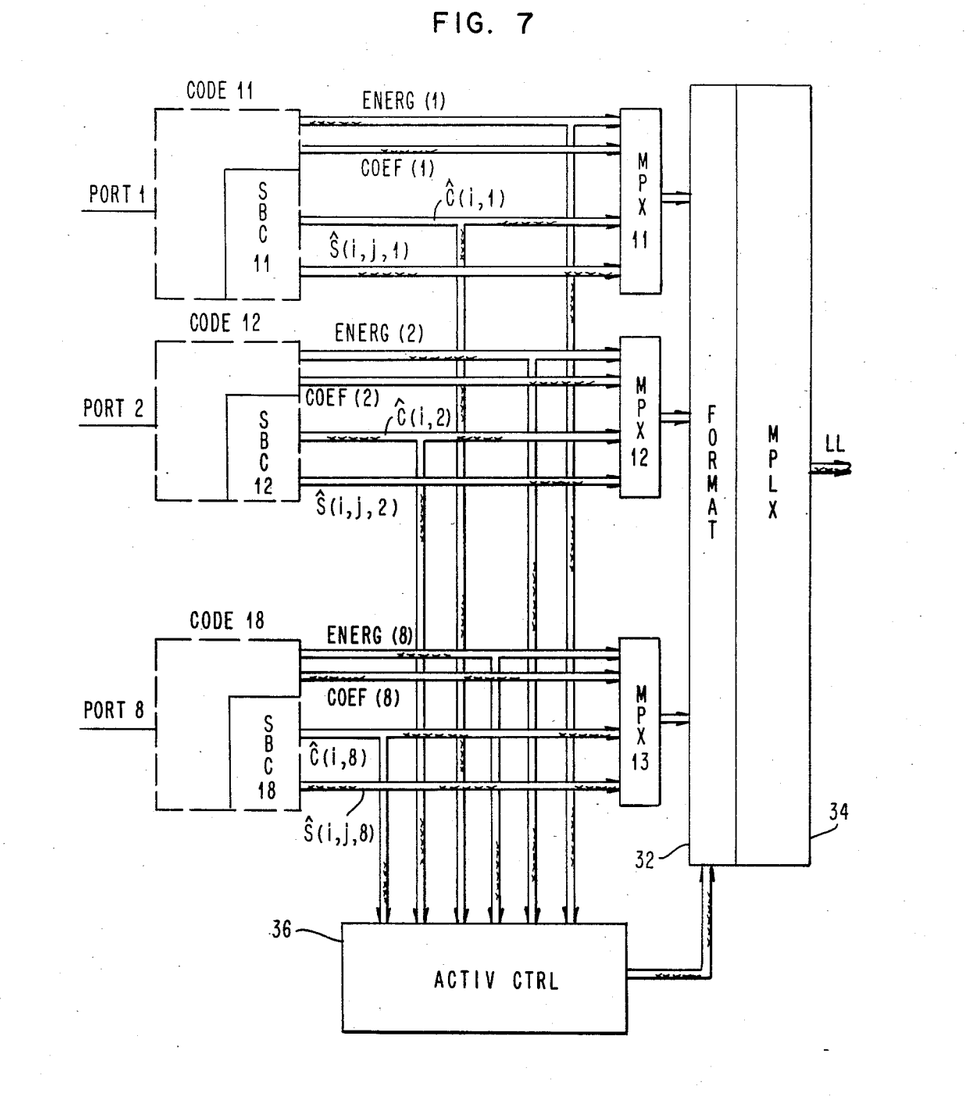

FIG. 7 represents a transmission device similar to that of FIG. 6 but using the coder of FIG. 4 or a similar coder of the predictive type where the SBC-processed signal would be the socalled baseband signal. Each of the L=8 ports is connected to a coder referenced CODE11 to CODE18. Each of these coders delivers an information ENERG(k) and COEF(k), k denoting the coder rank. This information ENERG and COEF is fed to formater MPX 11 to MPX 18. In addition, subband coders SBC11 to SBC18 associated with CODE11 to CODE18 respectively supply the terms C(i,k) and S(i,j,k) which are similar to those supplied by the coders of the device of FIG. 6 and which therefore will be handled in a similar way. However, information W'(1) through W'(8) which handles the relative activities of ports PORT1 to PORT8 will be built up in a slightly different manner to account for the energy information in the HF range of the speech signal. Instead of sorting only values C(i,k) according to expression (22'), the port activity controller ACTIV CTRL 36 sorts for this purpose values $C(i,k)^2$ and ENERG(k).

The operation of measuring the activity of each port is thus governed by the expression:

$$W(k) = \text{Max}[[C(i,k)]^2, \lambda.\text{ENERG}(k)] i = 1, \ldots, p \qquad (25)$$

where $\lambda$ is a numerical coefficient empirically determined to take into consideration the statistical differences of the energy distribution over high frequency and low frequency bands of the speech signal spectrum.

Formater 32 (which may truncate the multirate macro-sample) and multiplexing device 34 are similar to those shown in the diagram of FIG. 6. However, there is a basic difference between the macro-sample formats obtained with the device of FIG. 6 and those using the device of FIG. 7. In the second case, a bigger field (1) must be reserved because it will contain information ENERG(k) and COEF(k) in addition to the values C(i,k).

While the invention has been particularly shown and described with reference to a preferred embodiment thereof, it will be understood by those skilled in the art that numerous changes in form and detail may be made therein without departing from the spirit and scope of this invention. For example, in an embodiment of the invention similar to that of FIG. 7, it can be assumed that information ENERG and COEF of each port does not contribute to form the bit groups according to the format required for the multirate macro-sample and that it is directly transmitted to multiplexer 34.

I claim:

1. A method for digitally coding an electric signal for subsequent transmission at one of a plurality of different rates and in which said signal is sampled at a predetermined frequency and sub-band coded by dynamically allocating the coding bits to the sub-bands, the coding rate for all sub-bands being selected to conform to the highest rate in a set of predetermined rates, said method including the steps of:
   generating a macro-sample frame format for regrouping the bits obtained by coding all samples taken in all the sub-bands during the same sampling instant, said frame format being divided in a number of fields corresponding to the number of different bit rates in the set of bit rates;
   generating for each sampling instant a multi-rate macro-sample by distributing amongst said fields the bits obtained by coding each sample in the said macro-sample, according to the weight of the said bits and their distribution among the sub-bands, with reference to each of said rates in the said set; and,
   adjusting the signaling rate by truncating the said multi-rate macro-sample by dropping predetermined fields as a function of the selected bit rate.

2. A multi-rate coding method according to claim 1, wherein the signal is coded using so-called BCPCM techniques for coding the signal by blocks of successive samples representing a predetermined signal segment, each of said segments supplying a characteristic term with respect to which the samples of said segment are coded, said method including:
   reserving a predetermined number of bits for coding the characteristic terms of each block of samples, said rates in said set of predetermined rates being reduced accordingly;
   regrouping the bits resulting from the coding of the characteristic terms of each block within the same macro-sample field called characteristic block field.

3. A multi-rate coding method according to claim 2, characterized in that the bits resulting from each coded block of samples are arranged to have the characteristic block field followed by macro-samples of the same block.

4. A coding method according to claim 2, further characterized in that each block of samples is arranged in accordance with a format that regroups the bits of similar fields of all macro-samples of the same block of samples.

5. A digital coding method according to any one of claims 2 to 4 wherein said BCPCM type of sub-band coding is operated over the whole frequency spectrum of a voice signal to be transmitted.

6. A coding method according to any one of claims 2 to 4, characterized in that said sub-band coding is operated over a portion of the frequency spectrum of a voice signal.

7. A coding method according to claim 6, characterized in that said portion of the spectrum corresponds to the baseband of the voice signal.

* * * * *